United States Patent [19]

Vitkuske et al.

[11] Patent Number: 5,100,938
[45] Date of Patent: Mar. 31, 1992

[54] BITUMINOUS COMPOSITIONS AND METHODS OF APPLICATION TO SURFACES

[75] Inventors: John F. Vitkuske, Midland, Mich.; Lu H. Tung, Oakland, Calif.; Ronald R. Pelletier; Ronald E. Snyder, both of Midland, Mich.; William A. Gros, Baton Rouge, La.

[73] Assignee: The Dow Chemical Company, Midland, Mich.

[21] Appl. No.: 647,955

[22] Filed: Jan. 30, 1991

Related U.S. Application Data

[60] Continuation-in-part of Ser. No. 565,879, Aug. 10, 1989, abandoned, and a continuation-in-part of Ser. No. 604,393, Oct. 24, 1990, abandoned, which is a continuation of Ser. No. 343,715, Apr. 27, 1989, abandoned, which is a division of Ser. No. 157,765, Feb. 19, 1988, abandoned, said Ser. No. 565,879, is a continuation of Ser. No. 385,950, Jul. 27, 1989, abandoned, which is a continuation of Ser. No. 385,950, Jul. 27, 1989, abandoned, which is a continuation of Ser. No. 157,765.

[51] Int. Cl.$^5$ .............................................. C08L 95/00
[52] U.S. Cl. ........................................ 524/68; 524/60; 524/71
[58] Field of Search ........................... 524/60, 68, 71

[56] References Cited

U.S. PATENT DOCUMENTS

| | | | |
|---|---|---|---|
| 3,778,397 | 12/1973 | Ganon et al. | |
| 4,172,190 | 10/1979 | Tung et al. | 526/173 |
| 4,196,154 | 4/1980 | Tung et al. | 526/173 |
| 4,427,837 | 1/1984 | Tung et al. | 525/314 |
| 4,431,777 | 2/1984 | Tung et al. | 525/314 |
| 4,904,713 | 2/1990 | Vonk et al. | 514/71 |

FOREIGN PATENT DOCUMENTS 20931  2/1976  Japan ................................. 524/60

Primary Examiner—Kriellion S. Morgan
Assistant Examiner—Peter Szekely

[57] ABSTRACT

Disclosed are bituminous blends having improved toughness and elasticity. The blends contain an emulsion of a bituminous binder and an emulsion of a tapered block copolymer formed from a monovinyl aromatic compound and a conjugated diene. Suitable tapered block copolymers include a tapered A-B-A type block copolymer of the A-t-B-t-A configuration, particularly those having an isolated monovinyl aromatic compound content of about 20 to about 90 weight percent, and tapered A-B-A type block copolymers of the A-B-t-A configuration having an isolated styrene content of about 20 to about 90 weight percent of the total monovinyl aromatic compound in the tapered block copolymer. Also disclosed is a method of applying the blends to various surfaces.

7 Claims, No Drawings

BITUMINOUS COMPOSITIONS AND METHODS OF APPLICATION TO SURFACES

CROSS-REFERENCE TO A RELATED APPLICATION

The present application is a continuation-in-part application of co-pending applications U.S. Ser. No. 565,879 filed Aug. 10, 1989, now abandoned which is a continuation of U.S. Ser. No. 385,950, now abandoned filed July 27, 1989, which is a continuation of U.S. Ser. No. 157,765, now abandoned filed Feb. 19, 1988. The present application is also a continuation-in-part of U.S. Ser. No. 604,393,now abandoned filed Oct. 24, 1990, which is a continuation of U.S. Ser. No. 343,715, now abandoned filed Apr. 27, 1989, which is a divisional of U.S. Ser. No. 157,765, filed Feb. 19, 1988, now abandoned. All of the foregoing related applications are abandoned and the teachings therein are also incorporated herein by reference.

BACKGROUND OF THE INVENTION

The use of petroleum residuum such as asphalt as a paving material, crack sealant, chip sealant, roofing material and the like is well known. It is also well known that the physical properties of such asphalts can be modified by blending various polymeric materials, such as polyethylene, and elastomers, such as styrene-butadiene-styrene block copolymers with the asphalt.

The present invention is directed to asphalt blends containing specific block copolymers having improved toughness and elasticity compared to known blends employing tests well known in the art for comparative purposes.

SUMMARY OF THE INVENTION

A bituminous blend composition according to the present invention comprises an emulsion of a bituminous binder and an emulsion of from about 1 to about 20 weight percent of a tapered A-B-A block copolymer. The A block is formed from a monovinyl aromatic compound and the B block is formed from a tapered copolymer of a conjugated diene and the monovinyl aromatic compound. Optionally, a portion of the tapered copolymer may comprise a polymer of the conjugated diene.

A method of applying bituminous blends to various surfaces comprises spreading a blend of a bituminous emulsion and an emulsion of the above-described tapered A-B-A block copolymers with or without aggregate to the surface and removing the aqueous phase by evaporation. The tapered block copolymer comprises from about 1 to about 20 weight percent of the blend based upon the weight of the bituminous material and the copolymer.

DETAILED DESCRIPTION OF THE INVENTION

A tapered A-B-A block copolymer may have two different configurations, A-t-B-t-A and A-B-t-A.

A "tapered" A-B-A block copolymer of the A-t-B-t-A configuration is a block copolymer wherein the B block contains a gradual and continuous change of composition from A rich to B rich or less A rich and then back to A rich, as compared with an A-B-A configuration having an essentially pure A block connected directly to essentially pure B block and then to an essentially pure A block again. The tapered block copolymer of the A-t-B-t-A configuration may be distinguished from the entirely pure block copolymer configurations e.g., A-B or A-B-A or only one sided tapered block copolymers e.g., A-B-t-A or A-t-B.

A "tapered" A-B-A block copolymer of the A-B-t-A configuration is a block copolymer wherein an A block is connected directly to a B block or the B-rich portion of the B block, which have a gradual and continuous change of composition from B rich to another A block. The molecular weights of the two A blocks may or may not be identical. The tapered block copolymer of the A-B-t-A configuration may be distinguished from the entirely pure block copolymer configurations e.g., A-B or A-B-A, or two-sided tapered block copolymers such as A-t-B-t-A.

Particularly useful tapered A-B-A block copolymers are those having an isolated monovinyl aromatic monomer content of about 20 to about 90, more preferably of about 25 to about 80, and most preferably about 29 to about 75 weight percent of the total monovinyl aromatic compound in the tapered block copolymer. Isolated monovinyl aromatic compound content is a measure of the degree of taperedness; the higher the content, the higher the degree of taperedness. Isolated monovinyl aromatic monomer content is measured by proton nmr in accordance with the method of Moehel, *Rubber Chemistry and Technology*, vol. 40, p. 1200, 1967. Tapered block copolymers having an isolated monovinyl aromatic compound content of 20 percent or greater may be referred to as "enhanced" tapered block copolymers. Desirable enhanced tapered block copolymers include those of the A-t-B-t-A and A-B-t-A.

The tapered A-B-A block copolymers comprise from about 5 to about 50 weight percent of the monovinyl aromatic portion (preferably about 15 to about 40%) and from about 95 to about 50 weight percent (preferably about 85 to about 60%) of the diene portion.

The A block comprises a polymer formed from a monovinyl aromatic monomer of the formula:

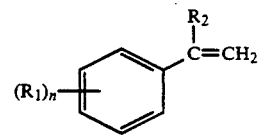

wherein n is an integer of 0 to 3, $R_1$ is individually selected from the group of alkyl radicals containing up to about 5 carbon atoms and $R_2$ is H— or $CH_3$— and mixtures thereof. Such compounds include styrene, α-methylstyrene, vinyl toluene (all isomers alone or in admixture), ethylstyrene, dimethylstyrene, trimethylstyrene, tertiary butylstyrene, tertiary amylstyrene, and isopropylstyrene. The A blocks may be comprised of the same or different monovinyl aromatic compounds The B block comprises a tapered copolymer of a conjugated diene and the monovinyl aromatic compound wherein a portion of the tapered copolymer optionally comprises a polymer of the conjugated diene. In the case of the tapered block copolymer of the A-t-B-t-A configuration, the tapered copolymer affords a composition change from A rich to B rich or less A rich then relatively gradually back to A rich. The taperedness of the B block allows a symmetrical or unsymmetrical gradual change in composition from one A block to the other. In the case of the tapered block copolymer of the A-B-t-A configuration, the tapered copolymer affords a relatively abrupt composition change from A rich to B rich or less A rich then gradually back to A rich. Conjugated dienes useful in the tapered block copolymers preferably have from about 4 to about 5 carbon atoms, for example, butadiene, isoprene, cis-1,3-pentadiene, trans-1,3-pentadiene, copolymers of two or more dienes such as butadiene and isoprene and block copolymers of two or more such dienes such as butadiene and isoprene.

The tapered block copolymer has a molecular weight of about 10,000 to about 1,000,000 preferably, (for reasons of better performance and handling) from about 50,000 to about 500,000 as determined by gel permeation chromatography.

Particular tapered block copolymers which are useful herein are those taught in U.S. Pat. Nos. 4,427,837, 4,431,777, 4,172,190 and 4,196,154, the teachings of which are specifically incorporated herein by reference.

Tapered A-t-B-t-A block copolymers may be prepared by utilizing difunctional organolithium initiators such as those seen in U.S. Pat. No. 4,196,154. Monovinyl aromatic monomer and conjugated diene monomer are added together for the polymerization. The kinetics of polymerization dictate that the conjugated diene is polymerized first. As the concentration of conjugated diene in the mixture is diminishing gradually during the polymerization reaction, the frequency of monovinyl aromatic monomer entering the chain increases gradually to form the tapered sequence. Eventually only monovinyl aromatic monomer will be left in the mixture to complete the A blocks in the A-t-B-t-A configuration. A typical solvent used for such polymerizations is cyclohexane.

Tapered A-t-B-t-A block copolymers of varying degrees of isolated monovinyl aromatic compound content may be prepared. Such block copolymers made in cyclohexane normally have an isolated monovinyl aromatic monomer content of less than 20% of the total monovinyl aromatic monomer in the tapered block copolymer. Enhanced tapered block copolymers with isolated monovinyl aromatic monomer content of greater than 20% may be prepared by replacing cyclohexane with a more polar hydrocarbon solvent such as toluene, or by the addition of a small amount of a polar aprotic compound to the solvent. Suitable polar aprotic compounds include tertiary amines such as triethyl amine, N,N,N',N'-tetramethylethylenediamine (TMEDA) or N,N,N',N'',N''-pentamethyldiethylenetriamine (PMDETA), or ethers such as diethylether or tetrahydrofuran (THF).

Tapered A-B-A block copolymers of the A-B-t-A configuration may be prepared by utilizing a monofunctional organolithium initiators, such as sec-butyllithium, to polymerize a quantity of a monovinyl aromatic compound in a suitable polymerization solvent such as cyclohexane first. At the end of the polymerization of the monovinyl aromatic compound and while the propagating chains are still living or reactive, a quantity of a mixture of the monovinyl aromatic compound and a conjugated diene are added to allow the mixture to polymerize onto the existing chain formed during the first polymerization. The first polymerization results in an A block or homopolymer of the monovinyl aromatic compound, and the second polymerization of the mixture completes the tapered A-B-t-A block copolymer. In the second polymerization, the conjugated diene polymerizes preferentially and the monovinyl aromatic compound less preferentially to form a B block having a composition which gradually extends from B rich or less A rich to more A rich or A rich and eventually only monovinyl aromatic monomer will be left to form the remaining A block.

A-B-t-A block copolymers of varying degrees of isolated monovinyl aromatic compound content may be prepared. Synthesis of the A-B-t-A block copolymer in cyclohexane normally results in a block copolymer with an isolated monovinyl aromatic compound content of less than 20% of the total monovinyl aromatic compound based on the weight of the total monovinyl aromatic compound in the block copolymer. The isolated monovinyl aromatic content may be enhanced above 20% by the use of the polar solvents and/or polar aprotic compounds described above. Alternatively, the tapered A-B-t-A block copolymer maybe enhanced by shifting the relative molecular weights of the A blocks from the first A block to the second A block, which is the A block in tapered relationship with the B block. Such shifting may be effected by using less monovinyl aromatic compound for the first polymerization described above and more for the second polymerization involving the polymerization of the mixture of the monovinyl aromatic compound and the conjugated diene.

The present blends will preferably comprise about 1 to about 20 weight percent and more preferably about 2 to about 10 percent of the tapered block copolymer based upon the weight of the tapered block copolymer and the binder.

The bituminous material employed in the practice of the present invention is not critical. Any bitumen or asphalt can be employed. U.S. Pat. No. 3,317,447 contains a good description of useful bituminous materials and the teachings of this patent are specifically incorporated herein by reference. In general, the asphalts which can be employed include conventional petroleum asphalts, natural asphalts, gilsonite, air blown asphalts, coal tar and other similar materials. The asphalts are characterized, for example, by having penetration grades of up to 300 as measured by ASTM Method D5. Asphalts are also characterized by a viscosity grading method, as defined and measured by ASTM 2171, i.e., AC2.5, AC5, AC10, AC20, AC30 and AC40. AC indicates asphalt cement and the number indicates viscosity at 140° F. in poise divided by 1000. Preferred asphalts are those with an AC grade of 40 or less, or penetration numbers of 300 or less. The choice of the degree of penetration will depend on the application for which the blend is to be used.

The bituminous binder or asphalt component is blended in an emulsion form. As is well known in the art, the asphalt emulsion is prepared, for example, by blending water, asphalt and a suitable emulsifying agent. Various methods for preparing such asphalt emulsions are taught, for example, in U.S. Pat. Nos. 4,547,224; 4,494,992; 4,478,642; 4,222,916; 4,209,337; 3,933,710; and 3,867,162.

The tapered block copolymer is blended in the composition of the invention in emulsion form. Emulsions of block copolymer solutions in water can be prepared by either direct or inverse emulsification techniques. Emulsions may be conveniently prepared from solutions of cyclohexane, toluene, or other hydrocarbon solvents containing 10 to 15 percent by weight polymer and using 2 to 5 percent surfactant by weight based on polymer. Suitable anionic surfactants are, for example, Aerosol OT ®, Alipal ® CO436, Triton ® R770 and mixtures (at about 3 to 1) of Siponate® DS10 (or Calsoft® L40) and Triton® X100 or similar nonionic surfactant. Quaternary ammonium based surfactants such as dodecyltrimethyl ammonium chloride and similar species (including ethoxolated versions) may be used to prepare cationically stabilized emulsions. Best results are often achieved by premixing the surfactant into the polymer solution and then combining with water. For the inversion process, about one volume of water is added at a moderate rate to the polymer-surfactant mixture with continuous moderate agitation, first forming a water-in-oil emulsion which usually inverts to an oil-in-water emulsion when about one half volume of water has been added. If a solvent free dispersion is desired, the solvent may be removed via azeotropic distillation and the resulting latex concentrated to 50 percent or higher solids e.g. by simply distilling out more water.

In the direct emulsification procedure, the polymer solution-surfactant mixture is added to about an equal volume of water with high shear mixing (e.g. Gifford-Wood Homogenizer Mixer) forming the oil-in-water emulsion directly. High shear mixing is continued for a few moments after completion of addition or, alternately, emulsion may be passed through a colloid mill. Solvent-free concentrated latex can be prepared as described above.

The emulsion-emulsion composition blend is prepared by mild mixing of the copolymer emulsion into the asphalt emulsion at the normal storage temperature (e.g. 20° C. to 85° C.) of the asphalt emulsion for a time sufficient to provide adequate homogeneity of the blend. Alternatively, the emulsified copolymer can be mixed with the surfactant employed to emulsify the asphalt and this mix is then emulsified with the asphalt employing know emulsification techniques.

Other emulsion forms of the block copolymer are taught in U.S. Pat. Nos. 3,238,172; 3,592,788; 3,565,842; 3,577,250; 3,936,406; 3,957,524; 3,988,275; 4,002,412 and 4,443,084; the teachings of which are specifically incorporated herein by reference.

The blend may contain other optional components usually employed in such materials, such as fillers, aggregates, sulfur and the like.

These bitumen blends may be used for roadcoatings, i.e., paving, because of their reduced tendency to rut at elevated temperatures. They are also useful at lower temperatures because of a reduced tendency to crack and ravel. These bitumen blends also exhibit a strong elasticity, a high plasticity interval, which means that they may also be used to advantage in the manufacture of industrial coatings (coatings, superficial coats, asphalt covers) or for industrial applications such as coverings, felts, shingles, paints, and products for the protection of car bottoms. They may also be used as crack sealants, chip sealants, and the like.

The present blends of bituminous material and tapered block copolymers have improved toughness and elasticity compared to prior art blends. Present blends utilizing enhanced tapered block copolymers have even more improved toughness and elasticity compared to prior art blends.

The following examples are provided for illustrative purposes and are not intended to limit the invention to the specific embodiments set forth therein.

Preparation of tapered A-B-A block copolymers

Procedure A

A tapered A-B-A block copolymer of the A-t-B-t-A configuration useful in the blends of the present invention was prepared. To a nitrogen purged 2 liter air-tight stirred reactor, 1400 mL purified toluene was added. To the same vessel, 230 mL of purified 1,3-butadiene and 80.6 mL of purified styrene were added. A 60 mL quantity of this reaction mixture was withdrawn from the reaction vessel and titrated with a toluene solution of 1,3-phenylene-bis(3-methyl-1-phenylpentylidene)-bis-(lithium), a difunctional organolithium initiator prepared as in U.S. Pat. No. 4,196,154 (the teachings of which are incorporated herein by reference) until a faint reddish color appeared. Based on the equivalency of the difunctional initiator used in the titration, an equivalent amount of s-butyllithium solution was added to the reaction mixture to blank out the impurities. The reaction mixture in the reactor was then heated to 50° C. and 1.78 millimoles of the above difunctional organolithium initiator solution was added to initiate the polymerization of butadiene. The temperature of the reaction mixture rose to about 80° C. in about 45 minutes after initiation. Shortly thereafter the faint yellowing solution turned to a more intense red color indicating that styrene polymerization had started. A second rise in temperature to about 84° C. was observed. Afterwards the temperature started to subside. The polymerization was allowed to proceed for 30 minutes after the color change and then was terminated by the addition of isopropyl alcohol. The recovered block copolymer was a tapered SBS triblock copolymer. A small portion of the polymer was recovered from the toluene solution for the molecular weight determination by gel permeation chromatography (GPC) (employing Millipore-Waters 150C instrument with 6 TSK columns). The molecular weight at the peak of the distribution as determined by GPC was 133,000. The polymer based on the feed used had 67% by weight butadiene and 33% by weight styrene.

Procedure B

A tapered A-B-A block copolymer of the A-t-B-t-A configuration useful in the blends of the present invention was prepared. In making a tapered block polymer the same conditions were used as that in Procedure A except that after the polymerization the reactive anions were carefully terminated by adding isopropyl alcohol dropwise until the red polystyryl anion color just disappeared. A 100 mL portion of syrup was withdrawn from the reactor for analysis. Afterwards another 230 mL of butadiene and 80.6 mL of styrene were added and the polymerization was repeated. The final syrup was saved and combined with another syrup made in exactly the same manner. The final polymer was a tapered SBS with a molecular weight of 131,000. The styrene content was 33% by weight and butadiene 67%.

Procedure C

A tapered A-B-A block copolymer of the A-t-B-t-A configuration useful in the blends of the present invention was prepared. The procedure used was similar to that of Procedure A with the exception that isopropoxide was used as a coinitiator together with the initiator used in preparing Polymer A. This coinitiator system is described in copending U.S. patent application Ser. No.

913,927 filed Oct. 1, 1986 abandoned. The molecular weight distribution of the block copolymer made is narrower than the block copolymer made without the isopropoxide. The polymer had a molecular weight of 150,000 at the peak of the GPC chromatogram and the Mw/Mn ratio for the block copolymer was 1.08. The isopropoxide was generated in situ by the reaction of isopropanol (isopropyl alcohol) with the blanking s-butyllithium. The 1/10 isopropanol/toluene was made in a 10 mL volumetric flask with about 1 mL isopropanol and toluene of sufficient quantity to make up the 10 mL volume. The concentration was therefore about 1.31N. The amount of isopropoxide generated was about 1.35 milliequivalents.

Procedure D

An tapered A-B-A block copolymer of the A-B-t-A configuration useful in the blends of the present invention was prepared. To a nitrogen purged 2 liter air-tight stirred reactor, 1350 mL purified cyclohexane was added. To the same vessel, 33.5 mL of purified styrene were added. The reaction mixture in the reactor was then heated to 55° C. and 3.12 millimoles of sec-butyllithium in cyclohexane solution was added to initiate styrene polymerization. After 30 minutes when styrene polymerization became essentially completed, 146 grams of butadiene premixed with 33.5 mL of purified styrene was added. Upon the addition, the strong dark orange color of the reaction mixture faded immediately until after most of the butadiene monomer was polymerized. The color of the faint yellowing solution turned once again to a more intense red color indicating that the second styrene polymerization has started. The polymerization was allowed to proceed for 30 minutes after the color change and then was terminated by the addition of isopropyl alcohol. The block copolymer was a half tapered-SBS triblock polymer. Proton nmr analysis showed the polymer had 69.1% butadiene and 30.9% styrene 14.2% of which was isolated styrene.

Procedure E

An enhanced tapered A-B-A block copolymer of the A-B-t-A configuration useful in the blends of the present invention was prepared. Procedure D was repeated except that 25 mL of styrene monomer was used in the preparation of the first polystyrene block and then 42 mL of styrene was mixed with butadiene for the second monomer addition. The half tapered-SBS recovered had 69.9% butadiene and 30.1% styrene, 22.8% of which was isolated styrene.

Procedure F

An enhanced tapered A-B-A block copolymer of the A-B-t-A configuration useful in the blends of the present invention was prepared. Procedure D was repeated except that 2.0 instead of 3.12 millimoles of sec-butyllithium was used as the initiator and 0.48 millimoles of PMDETA was used as a polar additive. The half tapered-SBS recovered has 69.7% butadiene and 30.3%, styrene 49.5% of which was isolated styrene.

Procedure G

An enhanced tapered A-B-A block copolymer of the A-B-t-A configuration useful in the blends of the present invention was prepared. Procedure E was repeated except that 2.37 instead of 3.12 millimoles of sec-butyllithium was used as the initiator and 0.57 millimoles of PMDETA was used as a polar additive. The half tapered-SBS recovered had 69.5% butadiene and 30.5% styrene, 64.0% of which was isolated styrene.

Procedure H

A tapered A-B-A block copolymer of the A-t-B-t-A configuration useful in the blends of the present invention was prepared. To a nitrogen purged 2 liter air-tight stirred reactor, 1350 ML purified toluene was added. To the same vessel, 222 mL of purified 1,3-butadiene and 77.8 mL of purified styrene were added. The reaction mixture in the reactor was then heated to 50° C. and 1.78 millimoles of a difunctional organolithium initiator solution was added to initiate the butadiene styrene copolymerization. The difunctional initiator was a toluene solution of 1,3-phenylene-bis(3-methyl-1-phenyl-pentylidene)-bis-(lithium), prepared as described in U.S. Pat. No. 4,196,154. At the initial stage the dark red initiator color quickly changed to a pale yellow indicating that the monomer being polymerized was mostly butadiene. The temperature of the reaction mixture rose to about 73° C. in about 1 hour after initiation. Shortly thereafter the faint yellowing solution turned to a more intense red color indicating that styrene polymerization had started. A second rise of temperature was observed. The polymerization was allowed to proceed for 30 minutes after the color change and then was terminated by the addition of isopropyl alcohol. The block copolymer was a tapered-SBS triblock polymer. The weight average molecular weight as determined by gpc was 178,000. The result of proton nmr analysis showed the polymer had 64.2% butadiene and 35.8% styrene 16.7% of which was isolated styrene.

Procedure I

An enhanced tapered A-B-A block copolymer of the A-t-B-t-A configuration useful in the blends of the present invention was prepared. The polymerization in Procedure H was repeated with the exception that 1.24 millimoles of initiator was used and 0.062 millimoles of PMDETA was added just before the addition of the initiator. The tapered-SBS obtained has a weight average molecular weight of 293,000 by gpc and a composition of 69.3% butadiene and 29.3% styrene. The amount of isolated styrene was enhanced to 29.3% from about 17% as a result of the added tertiary-triamine.

EXAMPLE 1

Mixing Polymer Emulsions with Asphalt Emulsions

Procedures A and B were employed to make various tapered block copolymers having different molecular weights and styrene content. Emulsions of the tapered block copolymers were added in various amounts to an asphalt emulsion and various characteristics of the blend determined. Each tapered block polymer emulsion was formed by adding an anionic surfactant and water to the toluene solution of the tapered block copolymer and emulsifying the blend by mixing in a high shear mixer. The toluene in the emulsion was then steam stripped under a vacuum and the emulsion was concentrated to greater than 50 percent by weight solids.

The specific block copolymer emulsions were mixed with the asphalt emulsions by thoroughly blending the emulsion with the asphalt emulsions while at a temperature of about 65° C. with continual mixing. The asphalt residuum was recovered from the emulsion using standard procedures described in AASHTO-T-59 Testing procedures. The recovered modified asphalt was then cast into test bars and subjected to one or more of the tests described below. The results are set forth in Table 1 below.

The tests to which the blends of modified asphalt were subjected are as follows:

A. Elastic recovery (%) was determined by measuring the amount of recovery after 10 centimeters extension in the ductility test.

B. Toughness and tenacity (in/lbs) was measured using the Benson test (test proposed by J. R. Benson, Consulting Bituminous Engineer of Denver, Colo. in 1955, reported in Utah State Specifications for Rubberized Asphalt). This test indicates the toughness of the modified asphalt as measured by the inch-pounds of work required to separate a tension head and cup holding the sample in the test apparatus.

C. Torsional recovery (%) is the test known in the art as California test 332 (CT 332). This test measures the amount of elasticity that is imparted to an asphalt residuum that was treated with an elastomeric latex or emulsion.

tween about 20 and about 90 weight percent of the total monovinyl aromatic compound in the tapered block copolymer is isolated.

2. The blend of claim 1, wherein between about 25 and about 80 weight percent of the total monovinyl aromatic compound in the tapered block copolymer is isolated.

3. The blend of claim 1, wherein between about 29 and about 75 weight percent of the total monovinyl aromatic compound in the tapered block copolymer is isolated.

4. The blend of claim 1, wherein the tapered block copolymer comprises about 2 to about 10 weight percent of the blend based upon the weight of the binder and the tapered block copolymer.

5. The blend of claim 1 wherein the monovinyl aromatic portion of the tapered block copolymer comprises about 5 to about 50 percent by weight and the conjugated diene portion of the tapered block copolymer comprises about 95 to about 50 percent by weight of the tapered block copolymer.

TABLE 1

| Test No. | Copolymer Emulsion | Type of Emulsion | Percent Copolymer in Blend (wt %)* | Mw at Peak | Wt. Ave. Mol Wt. | % Styrene | Elastic Recovery % | Torsional Recovery % |
|---|---|---|---|---|---|---|---|---|
| 1 | Tapered SBS Procedure A | anionic | 3 | 146,000 | 160,000 | 33 | 70 | 25.7 |
| 2 | Tapered SBS Procedure A | anionic | 3 | 160,000 | 182,000 | 33 | 70 | 26.1 |
| 3 | Tapered SBS Procedure A | anionic | 3 | 204,000 | 266,000 | 33 | 70 | 23.4 |
| 4 | Tapered SBS Procedure A | anionic | 3 | 154,000 | 190,000 | 38 | 72.5 | 17.6 |
| 5 | Tapered SBS Procedure A | anionic | 3 | 171,000 | 217,000 | 28 | 70 | 17.2 |
| 6 | Tapered SBS Procedure B | anionic | 3 | 150,000 | 153,000 | 33 | 70 | 18.9 |
| 7 | None (Marathon AC10 alone) | — | — | — | — | — | 0 | 0 |

*Based upon the weight of bituminous binder and copolymer

What is claimed is:

1. A blend comprising: an emulsion of a bituminous binder and from about 1 to about 20 weight percent of a tapered A-t-B-t-A or A-B-t-A block copolymer in an emulsion form based upon the weight of the binder and the tapered block copolymer, the A block being formed from a monovinyl aromatic compound and the B block being formed from a conjugated diene, wherein be- 6. The blend of claim 1 wherein the monovinyl aromatic portion of the tapered block copolymer comprises about 15 to about 40 percent by weight and the conjugated diene comprises about 85 to about 60 percent by weight of the tapered block copolymer.

7. The blend of claim 1, wherein the monovinyl aromatic monomer comprises styrene.

* * * * *